(12) United States Patent
De Gaspari et al.

(10) Patent No.: US 11,050,724 B2
(45) Date of Patent: Jun. 29, 2021

(54) IAAS-AIDED ACCESS CONTROL FOR INFORMATION CENTRIC NETWORKING WITH INTERNET-OF-THINGS

(71) Applicant: Cisco Technology, Inc., San Jose, CA (US)

(72) Inventors: Fabio De Gaspari, Padua (IT); Alberto Compagno, Clamart (FR); Luca Muscariello, Paris (FR); Giovanna Carofiglio, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 472 days.

(21) Appl. No.: 15/928,265

(22) Filed: Mar. 22, 2018

(65) Prior Publication Data
US 2019/0297063 A1 Sep. 26, 2019

(51) Int. Cl.
*H04L 29/06* (2006.01)
*H04L 9/08* (2006.01)

(52) U.S. Cl.
CPC .......... *H04L 63/0478* (2013.01); *H04L 9/088* (2013.01); *H04L 9/0822* (2013.01);
(Continued)

(58) Field of Classification Search
CPC . H04L 63/0478; H04L 9/0822; H04L 9/0861; H04L 9/088; H04L 9/0894; H04L 63/0435; H04L 63/061; H04L 63/168
See application file for complete search history.

(56) References Cited

U.S. PATENT DOCUMENTS

2004/0214570 A1* 10/2004 Zhang ............. H04W 12/04031
455/426.2
2016/0105279 A1* 4/2016 Zheng .................. H04L 9/0825
713/171
(Continued)

OTHER PUBLICATIONS

Barnett, Jr., et al., "Cisco Global Cloud Index 2015-2020," https://www.cisco.com/c/dam/m/en_us/service-provider/ciscoknowledgenetwork/files/622_11_15-16-Cisco_GCI_CKN_2015-2020_AMER_EMEAR_NOV2016.pdf, Nov. 2016, 59 pages.
(Continued)

*Primary Examiner* — Alexander Lagor
*Assistant Examiner* — Forrest L Carey
(74) *Attorney, Agent, or Firm* — Edell, Shapiro & Finnan, LLC

(57) ABSTRACT

A producer communicates over a network with a user application in an infrastructure-as-a-service (IaaS) and an IaaS node. The producer encrypts content with first encryption using a first key and second encryption using a second key, to produce twice encrypted content. The producer encrypts the second key with attribute-based encryption and symmetric encryption using an IaaS key, to produce a twice encrypted second key. The producer provides to the user application the twice encrypted content, the twice encrypted second key, and key information configured to remove the first encryption from the twice encrypted content. The producer provides to the IaaS node the IaaS key to enable the IaaS node to remove the symmetric encryption from the twice encrypted second key, such that the user application and the IaaS node are constrained to exchange with each other key-related information and intermediate decryption results in order to recover the content.

20 Claims, 10 Drawing Sheets

(52) U.S. Cl.
CPC .......... *H04L 9/0861* (2013.01); *H04L 9/0894* (2013.01); *H04L 63/0435* (2013.01); *H04L 63/061* (2013.01); *H04L 63/168* (2013.01)

(56) References Cited

U.S. PATENT DOCUMENTS

| | | | | |
|---|---|---|---|---|
| 2018/0260576 | A1* | 9/2018 | Miguel | H04L 63/06 |
| 2018/0367540 | A1* | 12/2018 | Miranda | H04L 63/0478 |
| 2019/0266343 | A1* | 8/2019 | Parida | H04L 9/008 |

OTHER PUBLICATIONS

OpenFog, "OpenFog Architecture Overview," White Pater, https://www.openfogconsortium.org/wp-content/uploads/OpenFog-Architecture-Overview-WP-2-2016.pdf, Feb. 2016, 35 pages.
Jacobson, et al., "Networking Named Content," CoNEXT'09, Dec. 2009, 12 pages.
Baccelli, et al., "Information Centric Networking in the IoT: Experiments with NDN in the Wild," ICN'14, Sep. 2014, 10 pages.
Dunkels, et al., "Distributed TCP Caching for Wireless Sensor Networks,"WWIC 2004, Mar. 2004, 17 pages.
Zhu, et al., "IOT Gateway: Bridging Wireless Sensor Networks into Internet of Things," 2010 IEEE/IFIP 8th International Conference on Embedded and Ubiquitous Computing (EUC), Dec. 2010, 6 pages.
Yu, et al., "Achieving Secure, Scalable and Fine-grained Data Access Control in Cloud Computing," 2010 Proceedings IEEE INFOCOM, Mar. 2010, 9 pages.
Yu, et al., "Attribute Based Data Sharing with Attribute Revocation," ASIACCS '10, Apr. 2010, 10 pages.
Li, et al., "Securing Personal Health Records in Cloud Computing: Patient-Centric and Fine-Grained Data Access Control in Multi-owner Settings," SecureComm 2010, Sep. 2010, 18 pages.
Garfinkel, et al., "Terra: A Virtual Machine-Based Platform for Trusted Computing," SOSP'03, Oct. 2003.
Santos, et al., "Towards Trusted Cloud Computing," HotCloud '09, Jun. 2009, 5 pages.
Trusted Computing Group, "Trusted Platform Module (TPM)," retrieved from https://trustedcomputinggroup.org/work-groups/trusted-platform-module/, Mar. 1, 2018, 4 pages.
Liu, et al., "Blackbox Traceable CP-AVE: Flow to Catch People Leaking Their Keys by Selling Decryption Devices on eBay," CCS '13, Nov. 2013, 26 pages.
Ning, et al., "White-Box Traceable Ciphertext-Policy Attribute-Based Encryption Supporting Flexible Attributes," IEEE Transactions on Information Forensics and Security, vol. 10, No. 6, Jun. 2015, 15 pages.
Rouselakis, et al., "New Constructions and Proof Methods for Large Universe Attribute-Based Encryption," Proceedings of the 2013 ACM SIGSAC conference on Computer & communications security, CCS '13, Nov. 2013, 27 pages.
Chor, et al., "Tracing Traitors," Advances in Cryptology—CRYPTO '94, Aug. 1994, 14 pages.
Boneh, et al., "An Efficient Public Key Traitor Tracing Scheme," Advances in Cryptology—CRYPTO' 99, Aug. 1999, 16 pages.
Boneh, et al., "Fully Collusion Resistant Traitor Tracing With Short Ciphertexts and Private Keys," Advances in Cryptology—EUROCRYPT 2006, May-Jun. 2006, 29 pages.
Akinyele, et al., "Charm: A Framework for Rapidly Prototyping Cryptosystems," Journal of Cryptographic Engineering, vol. 3, Issue 2, Jun. 2013, 19 pages.
HTTP Archive, Interesting Stats, Jul. 1, 2017, http://httparchive.org/interesting.php?a=All&l=Jul%201%202017, 16 pages.
Yang, et al., "Extended Proxy-Assisted Approach: Achieving Revocable Fine-Grained Encryption of Cloud Data," European Symposium on Research in Computer Security—Computer Security—ESORICS 2015, Sep. 2015, 21 pages.
Tremante, "Token Authentication for Cached Private Content and APIs," CLOUDFLARE Blog, Jan. 2017, https://blog.cloudflare.com/token-authentication-for-cached-private-content-and-apis/, 7 pages.
Wang, et al., "Steal This Movie: Automatically Bypassing DRM Protection in Streaming Media Services," Proceedings of the 22nd USENIX Security Symposium, Aug. 2013, 17 pages.
R.S. Da Silva, et al., "An Access Control Mechanism to Ensure Privacy in Named Data Networking using Attribute-based Encryption with Immediate Revocation of Privileges," 12th Annual IEEE Consumer Communications and Networking Conference (CCNC), Jan. 2015, 6 pages.
Bethencourt, et al., "Ciphertext-Policy Attribute-Based Encryption," IEEE Symposium on Security and Privacy—SP '07, May 2007, 14 pages.
Misra, et al., "AccConF: An Access Control Framework for Leveraging In-network Cached Data in the ICN-Enabled Wireless Edge," IEEE Transactions on Dependable and Secure Computing, Feb. 2017, 14 pages.
Tzeng, et al., "A Public-Key Traitor Tracing Scheme with Revocation Using Dynamic Shares," International Workshop on Public Key Cryptography, PKC 2001: Public Key Cryptography, Feb. 2001, 18 pages.
Liang, et al., "A Ciphertext-Policy Attribute-Based Proxy Re-Encryption with Chosen-Ciphertext Security," 2013 5th International Conference on Intelligent Networking and Collaborative Systems, Sep. 2013, 8 pages.

* cited by examiner though IoT deployments usually rely on Infrastructure-as-a-Service/Software-as-a-service (IaaS/SaaS) platforms in order to process the data generated. These platforms are generally managed by third parties and host many different applications. Only some of the applications may be authorized to access IoT data. Therefore, IoT deployments also need to maintain confidentiality of the IoT data with respect to the provider of an IaaS and any unauthorized applications. In order for real-life IoT deployments to benefit from the advantages brought by ICN, a secure and scalable access control protocol providing confidentiality with respect to unauthorized users of the IoT data and the IaaS deployments/providers is required.

IAAS-AIDED ACCESS CONTROL FOR INFORMATION CENTRIC NETWORKING WITH INTERNET-OF-THINGS

TECHNICAL FIELD

The present disclosure relates to managing access control for the Internet-of-Things (IoT).

BACKGROUND

An advantage of Information Centric Networking (ICN) over traditional networks architectures is in-network caching. In ICN, routers can cache content packets in order to serve future requests without the need to involve the content producer. This behavior increases availability and overall scalability of systems implemented with ICN, which is attractive for Internet-of-Things (IoT) deployments. However, in-network caching also introduces issues with respect to unauthorized access to protected content. Once published content is cached in the ICN routers, the content producer/publisher loses control over who can access the published content. Moreover, the publisher loses control over how the protected content is shared in the ICN, contrary to an Internet Protocol (IP)-based architecture in which the publisher can verify who receives the content. Given the resource constrained nature of IoT devices, IoT deployments usually rely on Infrastructure-as-a-Service/Software-as-a-service (IaaS/SaaS) platforms in order to process the data generated. These platforms are generally managed by third parties and host many different applications. Only some of the applications may be authorized to access IoT data. Therefore, IoT deployments also need to maintain confidentiality of the IoT data with respect to the provider of an IaaS and any unauthorized applications. In order for real-life IoT deployments to benefit from the advantages brought by ICN, a secure and scalable access control protocol providing confidentiality with respect to unauthorized users of the IoT data and the IaaS deployments/providers is required.

DESCRIPTION OF EXAMPLE EMBODIMENTS

Overview

Figure 1:
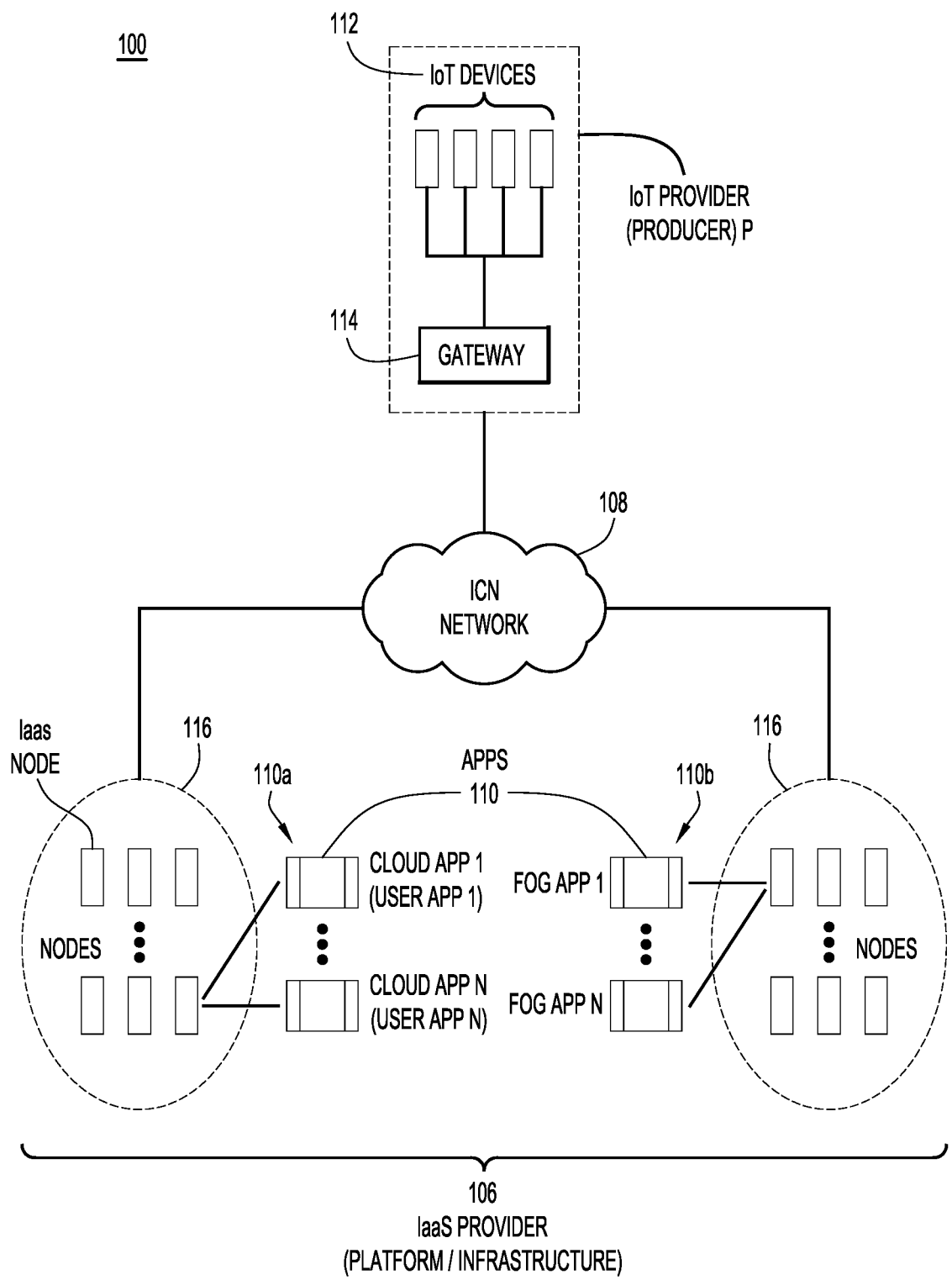
FIG. 1 is a block diagram of a system in which embodiments directed to Infrastructure-as-a-Service (IaaS)-aided access control for Information Centric Networking (ICN) with the Internet-of-Things (IoT) may be implemented, according to an example embodiment.

In one embodiment, a method is provided that is performed by a producer device configured to communicate over a network with a user application in an infrastructure-as-a-service (IaaS) and an IaaS node operated by a provider of the IaaS. The producer device encrypts content with first encryption using a first key and second encryption using a second key, to produce twice encrypted content. The producer device encrypts the second key with attribute-based encryption and symmetric encryption using an IaaS key, to produce a twice encrypted second key. The producer provides to the user application the twice encrypted content, the twice encrypted second key, and key information configured at least to enable removal of the first encryption from the twice encrypted content. The producer provides to the IaaS node the IaaS key to enable the IaaS node to remove the symmetric encryption from the twice encrypted second key, such that the user application and the IaaS node are constrained to exchange with each other key-related information and intermediate decryption results in order to recover the content from the twice encrypted content.

Example Embodiments

Information-Centric Networking (ICN) offers an alternative to the Internet Protocol (IP)-based networking. In ICN, individualized content objects (also referred to as "contents") are identified bases on unique names and can be cached in-network in order to immediately service subsequent requests. This is particularly important in the context of the Internet-of-Things (IoT), where it is important to heavily reduce loads on the "Things," as well as increase content availability and decrease energy consumption.

The IoT is a next step in the evolution of the Internet: a complex mesh of always-connected network devices, providing huge amounts of data in a variety of sectors. However, IoT also presents challenges. Supporting IoT entails a considerable shift from current Internet architecture, requiring ad-hoc solutions to problems caused by the introduction of low-powered devices in an end-to-end based network. Moreover, widespread IoT deployment is also contingent on finding ways to manage the huge amounts of data the devices will generate. While much of this data will be ephemeral in nature and will not require storing, a large amount will. Given the resource-constrained nature of the IoT devices (i.e., the "Things") themselves, processing and storing must be offloaded to external platforms, as attested to by the rise of new paradigms such as Edge/Fog computing and the continuous thriving of Cloud computing; however, offloading implies transferring the data to external platforms, which in the IoT scenario entails sometimes prohibitive bandwidth requirements. Moreover, the problem of bandwidth usage is further exacerbated in scenarios where there are multiple consumers, such as in the case of a public or semi-public IoT deployment offering live data to several users, alongside long-term data stored in the cloud.

A natural fit to alleviate these problems is ICN. ICN is an alternative network architecture built upon name-based communication. In ICN, all content is uniquely named: consumers request a content based on its name, which is used by ICN nodes to automatically localise and return the content. When serving a request, ICN nodes can opportunistically store the requested content in their local cache. Caching allows ICN nodes to satisfy further requests for the same content directly, without the need to contact the producer again. In-network caching and name-based content retrieval provide a considerable number of advantages, especially in the context of IoT. Firstly, applying ICN in the context of IoT allows to reduce the load on the devices due to network caching. For an IoT deployment, a reduced number of requests translates into lower energy consumption and longer lifespan. Secondly, ICN reduces bandwidth requirements and provides a natural mechanism to purge obsolete content from the network: the more a content is requested, the more nodes will eventually cache it, reducing the upstream bandwidth required to service requests. Conversely, less requested contents are gradually evicted from nodes' caches, leaving space for newly published contents. Thirdly, ICN caches increase the availability of content in the network in case the producer is unreachable or overloaded, which can easily happen when dealing with resource-constrained devices. Finally, the problem of addressing the IoT devices, another major hurdle of host-to-host communication, is naturally eliminated in ICN.

However, ICN also introduces challenges from the point of view of access control. Due to the distributed caching of ICN, after publication a producer cannot directly control how a content is distributed in the network, nor who can or cannot retrieve it. This lack of control is a considerable problem if content access must be restricted to a set of authorized users. Several encryption-based access control solutions have been proposed to tackle this problem, but they all suffer from one or more drawbacks. The first major problem relates to a user's access revocation. Once a user has access to the decryption key(s) for a set of protected contents, it is challenging to devise a revocation system that is both effective and efficient. Secondly, it is highly desirable to identify users who disclose their decryption keys in order to take appropriate actions, which requires traitor tracing capabilities. Finally, these problems are exacerbated by the requirement of preserving efficient network caching. Therefore, devising an effective general-purpose access control solution for ICN is still an important unresolved problem.

Motivated by the reliance of IoT on external platforms such as Cloud and Fog and by the advantages provided by ICN, embodiments presented herein provide a fine-grained access control protocol for IoT deployments based on Infrastructure-as-a-Service/Platform-as-a-Service (PaaS) (collectively referred to as "IaaS"). The protocol takes advantage of the IaaS/PaaS infrastructure to preserve all desirable properties of ICN, while at the same time providing confidentiality, revocation and traitor-tracing capabilities. At the same time, the protocol preserves both network caching and location-independent content retrieval, and does not pose significant overheads in terms of a size overhead and a computational overhead. Moreover, the protocol can be easily integrated in existing deployments transparently with respect to users' applications. The protocol is based on a combination of attribute-based encryption (ABE) and layered encryption, which allows the protocol to scale to any number of users without significant overheads. The protocol can be employed as a general access control solution for ICN.

Information-Centric Networking

ICN is a novel network architecture proposed to address the shortcomings of the current IP based architecture. In ICN, each content is uniquely identified with a name. Users retrieve content by issuing interest packets that carry the unique content name. Routing in ICN is entirely based on content names, rather than on addresses of the two particular endpoints of a communication. ICN-enabled routers can store contents in their local caches, allowing for immediate satisfaction of subsequent requests for the same content. These two characteristics allow for location-independent content retrieval: it is irrelevant who satisfies an interest. The main concern is the authenticity of the content, which is guaranteed by means of signatures on the packets carrying content (i.e., content packets) by the producer of the content.

ICN architectures provide several advantages, in particular with regard to bandwidth efficiency and producer load. Network caching both reduces the overall network bandwidth required to satisfy a request, and reduces the total number of requests received by the producer. Moreover, ICN network caching provides increases content availability, since it allows retrieval of content even in case a producer is offline.

Ciphertext-Policy Attribute-Based Encryption

Ciphertext-Policy Attribute-Based Encryption (CP-ABE) is a cryptographic primitive which associates an access structure to a ciphertext, and only decryption keys which satisfy the access structure allow for the decryption of the content. Specifically, upon generation, a CP-ABE decryption key is associated with a number of attributes from an attribute universe $\mu$. During encryption, a plaintext is associated with an access structure A over the attributes in $\mu$. "A" defines the authorized sets of attributes $U_j \subset \mu$: the sets of attributes a CP-ABE key must have to successfully decrypt the ciphertext. The attributes may include, for example, any string of alphanumeric characters indicating a user identifier or name, a user address, a company name, membership identifier, user resource locator, and so on.

Formally, a CP-ABE scheme includes four algorithms:

a. Setup: Takes as input the security parameter and outputs the master key MK and the public parameters PP.

b. Key Generation (MK,S): Takes as input the master key MK and the set of attributes S describing the key to be generated. It outputs the key SK, associated with attributes S.

c. Encrypt(PP,m,A): Takes as input the public parameters PP, the plaintext message m and the access structure A over the attribute universe. Returns the ciphertext c, encrypted such that only users whose attributes satisfy A can decrypt the message.

d. Decrypt(PP,c,SK): Takes as input the public parameters PP, the ciphertext c, and the private ABE key SK. Returns the plaintext m if the set of attributes associated with SK satisfy the access structure A associated with the ciphertext c, or $\perp$ (i.e., "null/empty" or "fail/false" indicator) otherwise.

e. A Traceable Attribute-Based Encryption scheme (TABE) provides, in addition to the properties of classical ABE, the ability to trace the owner of a given secret ABE key. A TABE scheme is formally defined by a tuple of five algorithms: the four algorithms described above, where Key Generation takes an additional $ID_u$ parameter (representing the ID of the user), plus a fifth Trace algorithm.

f. Trace(SK): Takes as input the secret key SK of user u. Returns the identity of the user $ID_u$, or $\bot$ if the key cannot be traced.

With reference to FIG. 1, there is a block diagram of an example system 100 in which embodiments directed to IaaS-aided access control for ICN with IoT may be implemented. System 100 includes an IoT provider P (or "producer"), an IaaS/PaaS (i.e., "IaaS") provider 106, and an ICN network 108 connected to the IoT provider P and the IaaS provider. The IoT provider P deploys and manages a number of IoT devices 112 over a geographic area, generating data for subscribed users. By way of example, the IoT devices 112 are connected to the ICN network 108 (and the Internet) through an IoT provider P gateway 114. In addition, the connection between the IoT devices 112 and the gateway 114 is secured.

The IaaS provider 106 offers to third parties (e.g., Fog and Cloud providers) platforms or nodes 116 to host a variety of applications ("apps") 110, and the means to access the data generated by the IoT provider P via the ICN network 108. For instance, Fog providers deploy and manage a set of Fog applications 110a hosted on Fog nodes among nodes 116, and Cloud providers deploy and manage a set of Cloud applications 110b hosted on Cloud nodes among nodes 116. Users deploy user applications ("apps") among applications 110, either their own or purchased, and access data generated by the IoT devices 112 based on a subscription with the IoT provider P. Nodes 116 and applications hosted on the nodes may communicate with each over one or more infrastructure networks and/or communication links, as is known. The IaaS provider 106 includes at least one IaaS provider node (also referred to as the "IaaS node") among nodes 116. The at least one IaaS node hosts an IaaS provider application configured to perform management and access protocol security functions in support of embodiments presented herein. In an embodiment, each node 116 may host a respective IaaS provider application. In accordance with embodiments presented herein, IoT provider P, a user application among applications 110, and the IaaS provider 106 (via the at least one IaaS node) cooperate/interact with each other to implement an access control protocol ("protocol") aimed at providing confidentiality for the IoT data with respect to the IaaS provider and any unauthorized user. In another example, the protocol may be used when no gateway is present. In the ensuing description, the terms "IaaS" and "IaaS provider" refer to either the overall infrastructure of the IaaS provider 106, generally, or the IaaS node, specifically, depending on context.

It is assumed there is no trust relationship between any two parties in the system. It is also assumed that the IaaS provider (e.g., IaaS node) is semi-trusted, meaning that it follows the protocol, but tries to obtain as much information about the IoT data as possible (also called honest-but-curious). Users, both authorized and unauthorized, can be malicious and can collude to access the IoT data. It is assumed that the IaaS and authorized users do not collude, and that the IaaS cannot access the data of the users' that are executing applications. To this end, techniques can be employed to provide confidentiality and remote attestation by building on top of a Trusted Platform Module (TPM). No restrictions are placed on collusion between the IaaS and unauthorized users. Finally, it is assumed that, for content of particular interest, the IaaS may collude with revoked users, where "revoked users" are defined as users who were previously authorized, but lost their access privileges.

An ideal access control protocol should provide a number of properties:

a. Access Control. Only authorized users can access protected data.

b. Revocation. It should be possible to revoke access to previously authorized users.

c. Non-Delegable. An authorized user should not be able to arbitrarily delegate access to unauthorized users.

Since a user can always give an access token of that user to an unauthorized user, hence "delegating" access rights to the unauthorized user, the following weaker traceability property is accepted instead of non-delegability:

Traceability. To provide accountability, it should be possible to link a leaked access token to its owner.

In particular, the requirement of Traceability rules out naïve use of hybrid encryption, where a symmetric key used to encrypt the content is further encrypted using asymmetric encryption techniques. Indeed, this can allow a malicious authorized user to leak the symmetric key to an unauthorized user, without possibility of identifying the traitor.

In addition to these general access control properties, the protocol should preserve efficient network caching, location-independent routing and improved content availability provided by the ICN:

a. Caching. All authorized users should be able to access any of the copies of the content cached in the ICN network.

b. Location-Independent Routing. It does not matter where a request from an authorized user is satisfied.

c. Offline Access Control. The access control mechanism should not require the producer to be online to function.

The Access Control Protocol

An access control protocol is now described that satisfies all of the properties defined above. The security of the access control protocol based on the assumptions presented above is also discussed.

Table I below defines a notation used in describing the protocol in detail below.

TABLE I

Table of Notation

| | |
|---|---|
| P | Producer (IoT provider). |
| IaaS | IaaS provider/IaaS node. |
| $u_i \in U$ | User $u_i$ from the group of users U. |
| Enc, Dec | Symmetric encryption/decryption. |
| $E_{ABE}$, $D_{ABE}$ | CP-ABE (or simply "ABE") encryption/decryption. |
| $SK_P$, $PK_P$ | Private and public key of the Producer. |
| MK, P P | Master and public CP-ABE keys. |
| $K_{IaaS}$ | Symmetric key shared between Producer and IaaS (also "IaaS key"). |
| $K_m$ | First layer symmetric key for content m (also "first key"). |
| $SK_{ui}$ | Private CP-ABE key of user $u_i \in U$ (also "attribute-based private user $\in$ |
| $SK_{ui}$ | Private CP-ABE key of user $u_i \in U$ (also "attribute-based private user key"). |
| $r_m$ | Second layer symmetric key for content m (also "second key"). |
| $\omega r_m$ | Expiration (time-to-live) information of $r_m$. |
| $\tau_m$ | Access structure for content m. |
| $\gamma_{ui} = \{\gamma_{1,ui}, \ldots, \gamma_{j,ui}\}$ | Attributes of user $u_i$. |
| \| | Concatenation operator |
| $\bot$ | Null/empty or fail/false indicator |

Protocol Feature

A feature of the protocol is to split or divide between the IaaS provider (e.g., the IaaS node) and the user (i.e., the user application) mutually exclusive first and second key-related information, respectively, necessary or required to access/recover (plain text) content from protected (i.e., encrypted) content, so that no single one of them (i.e., no single party) alone has enough information to decrypt the content, but acting together they do. Under the protocol, the IoT provider respectively provides to the user application and the IaaS provider first key information and second key information that does not include the first key information, such that both the first key information and the second key information are required to recover the content from the protected content. As a result the IaaS provider (i.e., IaaS node) and the user application are required or constrained to share with each other the different key information, or other information related to the mutually exclusive key information, in order to decrypt the content, as described below. Moreover, the protocol further uses the IaaS node as a trusted platform module in order to securely implement hybrid encryption and to enable revocation. The protocol employs CP-ABE to encrypt a symmetric key, which in turn is used to encrypt the content to be published, providing fine-grained access policy enforcement. In order to avoid the pitfalls of hybrid encryption, the protocol is augmented by means of layered encryption based on a secret shared between the IoT provider and the IaaS provider (i.e., IaaS node) to further encapsulate the encrypted content. The use of layered encryption on the content means that, even if a malicious user leaks the symmetric key, this alone is not enough to decrypt the content.

Figure 2:
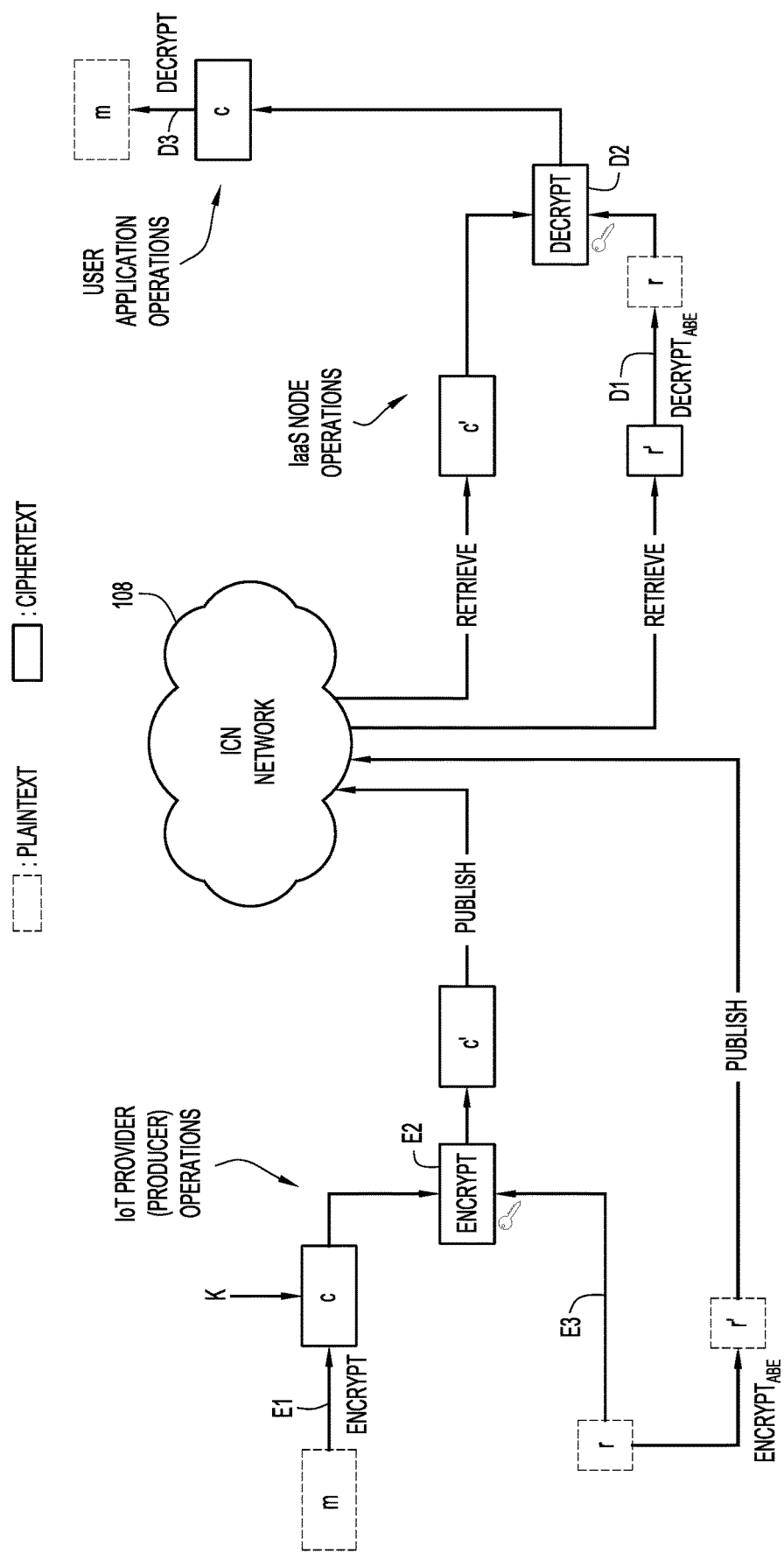
FIG. 2 is a high-level, simplified view of an access protocol for IaaS-aided access control for ICN with IoT, according to an example embodiment.

With reference to FIG. 2, there is shown a high-level, simplified view of an example of the protocol. On the left-hand side of FIG. 2: at E1, the IoT provider P encrypts content m with a first key K to produce first encrypted content c; at E2, the IoT provider P encrypts the first encrypted content c with a second key r (such as a random nonce, for example) to produce twice encrypted content c; and then the IoT provider P publishes the twice encrypted content c' to the ICN, which makes c' available to/retrievable from the ICN. Also: at E3, the IoT provider P encrypts the second key r at least once using ABE encryption to produce an ABE encrypted second key r' (and may encrypt the ABE encrypted second key r' to produce a twice encrypted second key—referred to below as $\rho'_m$); and then the IoT provider P publishes the encrypted second key r' (or the twice encrypted second key $\rho'_m$) to the ICN.

On the right-hand side of FIG. 2, a user application (hosted on an IaaS provider platform) and the IaaS node work together/cooperate to retrieve from the ICN network and share the published information c', r' (or the twice encrypted second key) and related key information derived by the user application as described below. Armed with this shared information: at D1, the IaaS node decrypts the encrypted second key r' (or the twice encrypted second key) using ABE decryption to recover the second key r; at D2, decrypts c' (i.e., removes the outer encryption layer from c') to recover c; and the IaaS node passes c to the user application. At D3, the user application decrypts the c' to recover m.

Notation, Construction and Correctness

Figure 3:
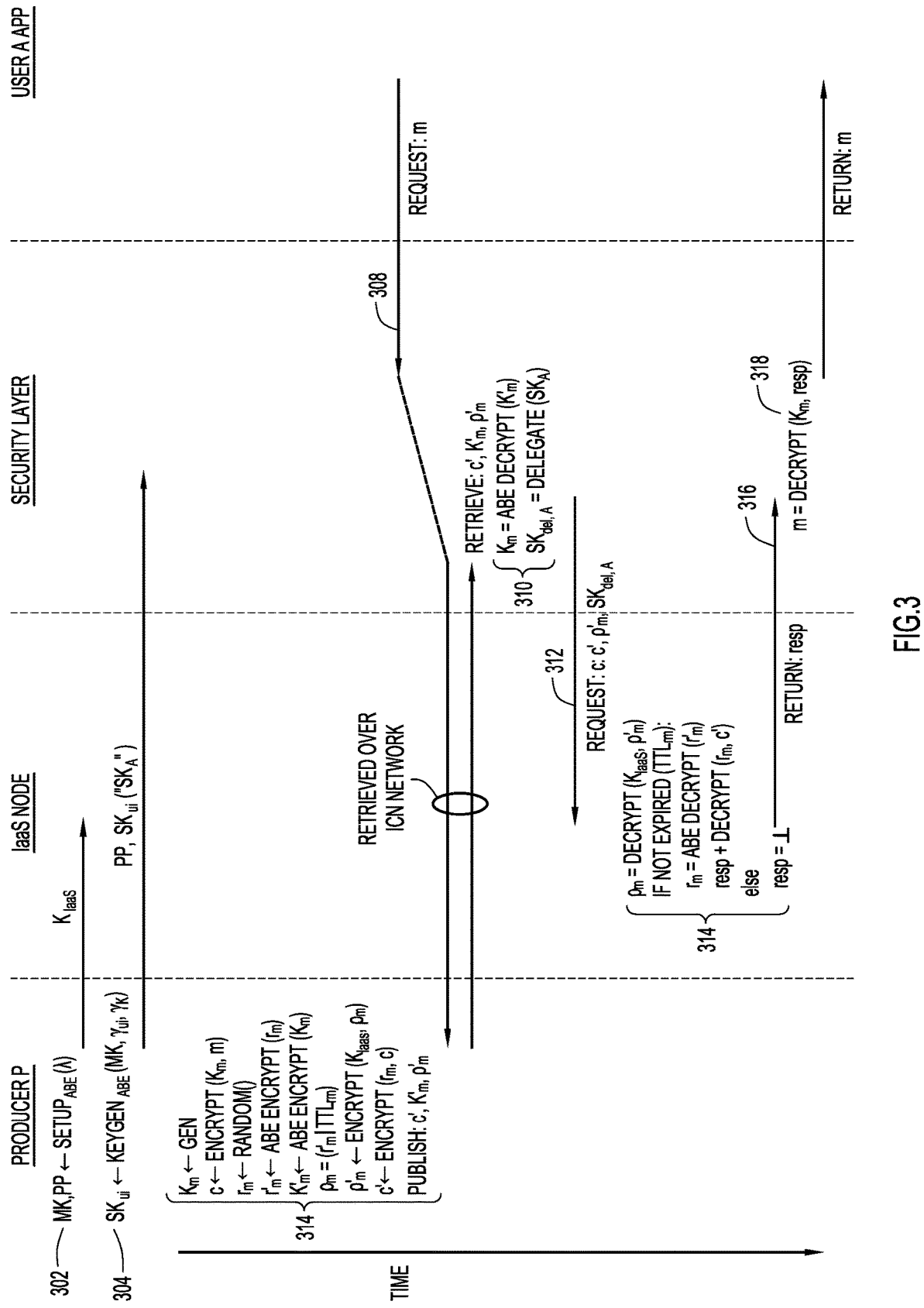
FIG. 3 is a sequence diagram summarizing operations of and interactions between actors of the system of FIG. 1 relevant to the access protocol, according to an example embodiment.

Details of the protocol are now described. The notation used is as presented in Table I. The protocol is executed between three entities: (1) the producer P (i.e., the IoT provider); (2) the IaaS node of the IaaS provider, which owns IaaS nodes $n_i \in IaaS$; (3) the user $u_i \in U$. The protocol is described with reference to FIG. 3. FIG. 3 is a sequence diagram summarizing example operations of and interactions between the actors of FIG. 1 relevant to the protocol, including the producer P, the IaaS node, a user application A among applications 110 (referred to in FIG. 3 as "user A app"), and a security layer also hosted on a platform of the IaaS provider. The security layer may be separately hosted on the same platform/node as the user application, or may be fully integrated with the user application, and represents a library of call functions that are invoked by the user application and/or performed on behalf of the user application. Thus, the security layer may be considered part of the user application for purposes of protocol functionality. Accordingly, the three main actors of the protocol include the producer P, the IaaS node, and the user application working integrally with the security layer.

Bootstrap

At 302, based on the required security parameter, the producer P generates the system master ABE key and public parameters, as follows: MK,PP←Setup$_{ABE}$($\lambda$). The producer P also generates the symmetric key $K_{IaaS}$, and shares it with the IaaS node.

User Registration

At 304, the producer P generates the private ABE key for user u, based on the user's attributes $\gamma_{ui}$ and the special attribute $\gamma_K$, as follows $SK_{ui}$←KeyGen$_{ABE}$(MK,$\gamma_{ui}$,$\gamma_K$) and provides it to the user together with PP (304). Private ABE key d is also referred to as private ABE key "$SK_A$" because it pertains to user A. The parameter $\gamma_K$ is a special attribute required to decrypt the first layer symmetric key $K_m$, as explained below.

Content Publication

At 306, given a plaintext content m, gateway 114 of the producer P:

a. Generates the first layer symmetric key $K_m$ (also referred to as the "first key") for content m according to $K_m \leftarrow \mathcal{K}$, where $\mathcal{K}$ is the keyspace, and encrypts the content m with the first key $K_m$ as follows: c←Enc($K_m$, m). P also generates the second layer symmetric key $r_m$ (also referred to as the "second key").

b. Encrypts second key $r_m$ using ABE with access structure $\tau_m$, $r'_m$←Enc$_{ABE}$(MK,$r_m$,$\tau_m$), and encrypts first key $K_m$ with access structure $\tau_{Km}$, ("encrypted user key") $K'_m$←Enc$_{ABE}$(MK,$K_m$,$\tau_{Km}$). The access structure $\tau_{Km}$ requires a user's CP-ABE key with the attribute $\gamma_K$ to be satisfied. The producer P further concatenates $r'_m$ with expiration information $\omega_{rm}$, $\rho_m$=($r'_m$||$\omega_{rm}$), and encapsulates/encrypts the result with $K_{IaaS}$, the IaaS shared key: $\rho'_m$←Enc($K_{IaaS}$,$\rho_m$). Then, the producer P signs the encrypted $\rho'_m$. The use of layered encryption on $r_m$ ensures that no user can recover it without interacting with the IaaS node. The role of the expiration information corm is described below in in connection with revocation.

c. Finally, the producer P computes c'=Enc($r_m$,c) and publishes c',$K'_m$ and $\rho'_m$ in the ICN network.

Content Retrieval

At 308, the application of an authorized user ui (e.g., user A app, in FIG. 3)) who wants to access protected content for m, retrieves published c',$K'_m$ and $\rho'_m$ from the ICN network. In the ensuing description of the content retrieval phase, the functionality of the security layer is considered part of the user application. At 310, if the attributes of $SK_{ui}$ satisfy the access structure $\tau_{Km}$ available/known to the user application, the user application recovers $K_m$=Dec$_{ABE}$($SK_{ui}$,$K'_m$). From $SK_{ui}$, the application generates a delegate key $SK_{del,ui}$ (also referred to as "$SK_{del,A}$"), which includes the subset of attributes $\{\gamma_{ui}|\gamma_{ui}\Sigma SK_{ui}\}\backslash\gamma_K$. At 312, the user application then forwards to the local IaaS node a request to compute c on behalf of the user application. The request passes to the IaaS node the parameters c', $\rho'_m$, and $SK_{del,ui}$. It is worth noting that the IaaS cannot use $SK_{del,ui}$ to decrypt $K'_m$, since it does not have the attribute $\gamma_K$.

At 314, the IaaS node verifies the signature on $\rho'_m$, recovers $\rho_m = Dec(K_{IaaS}, \rho'_m)$ and validates the expiration information $\omega_{rm}$. Upon successful validation, the IaaS node uses $SK_{del,ui}$ to recover $r_m = Dec_{ABE}(SK_{ui}, r'_m)$, which will work if $\gamma_{ui}$ satisfies $\tau_m$ (i.e., user $u_i$ is authorized). At 316, the IaaS node returns to the user application $c = Dec(r_m, c')$ if the $Dec_{ABE}$ was successful, and $\perp$ otherwise. Finally, at 318, the user's application recovers the plaintext $m = Dec(K_m, c)$.

Combined Publication and Retrieval

Figure 4:
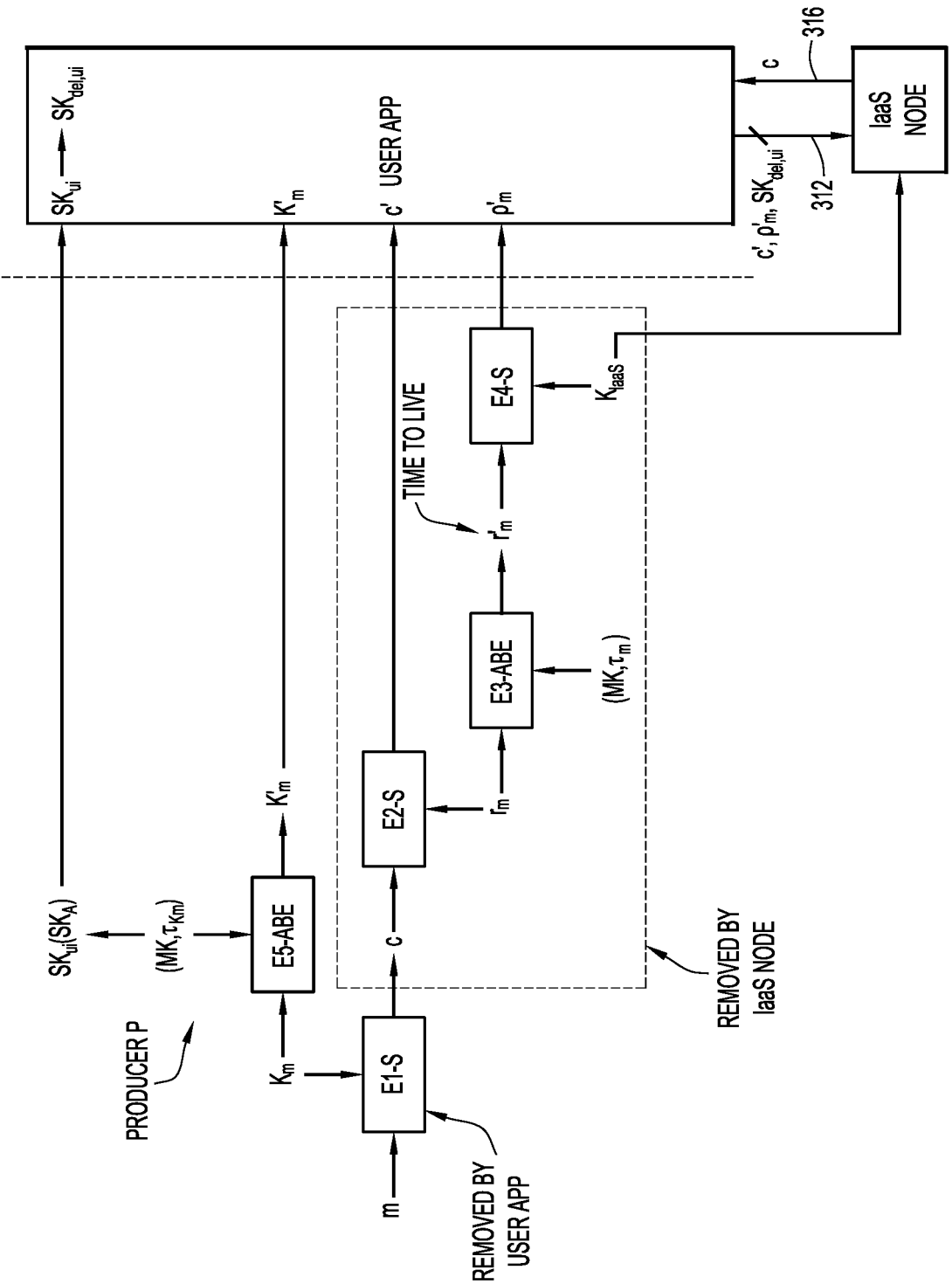
FIG. 4 is an illustration of the access protocol summarizing both encryption and decryption operations depicted in the sequence diagram, according to an example embodiment.

With reference to FIG. 4, there is shown a view of an example of the protocol summarizing both encryption and decryption operations described above, which is described also with reference to FIG. 3. As shown at the left-hand side of FIG. 4, the producer P first encrypts the content m with symmetric encryption E1-S using first key $K_m$ to produce once encrypted content c, and then second encrypts the once encrypted content c with symmetric encryption E2-S using the second key $r_m$ to produce the twice encrypted content c'. That is, producer P applies two-layer symmetric encryption to content m with first key $K_m$ and then second key $r_m$. The producer P also first encrypts second key $r_m$ using ABE encryption E3-ABE with the master key MK and access structure $\tau_m$ to produce once encrypted second key $r'_m$, concatenates $r'_m$ with second key time-to-live information to produce $\rho_m$, and then encrypts $\rho_m$ using symmetric encryption E4-S with key $K_{IaaS}$, to produce twice encrypted second key $\rho'_m$. The producer P also encrypts first key $K_m$ using ABE encryption E5-ABE with the master key MK and access structure $\tau_{Km}$ to produce encrypted key $K'_m$, and generates ABE (private user) key $SK_{ui}$ (configured to decrypt $K'_m$ and also to derive delegate ABE key $SK_{del,ui}$, which is configured to decrypt the once encrypted second key $r'_m$). Producer P sends to the user application c', $\rho'_m$, $K'_m$, and $SK_{ui}$. The keys $K'_m$ and $SK_{ui}$ represent "key information" associated with/related to the symmetric key $K_m$.

As shown on the right-hand side of FIG. 4, using the first key information including $K'_m$ and $SK_{ui}$, the user application derives the delegate key $SK_{del,ui} \leftarrow SK_{ui}$, and provides c', $\rho'_m$, and $SK_{del,ui}$ to the IaaS node along with a request for c. In turn, the IaaS node removes from the twice encrypted second key $\rho'_m$ (i) the symmetric encryption E4-S using decryption with symmetric key $K_{IaaS}$, and then (ii) the ABE encryption E3-ABE using ABE decryption with $SK_{del,ui}$, to recover the second key $r_m$. Then, the IaaS node removes from the twice encrypted content c' the symmetric encryption E2-S with the recovered second key $r_m$ to recover the once encrypted content c, and provides c to the user application. In turn, the user application removes from the once encrypted content c the symmetric encryption E1-S using $K_m$ to recover m.

Flowcharts for Producer, User Application, and IaaS Node

Figure 5A:
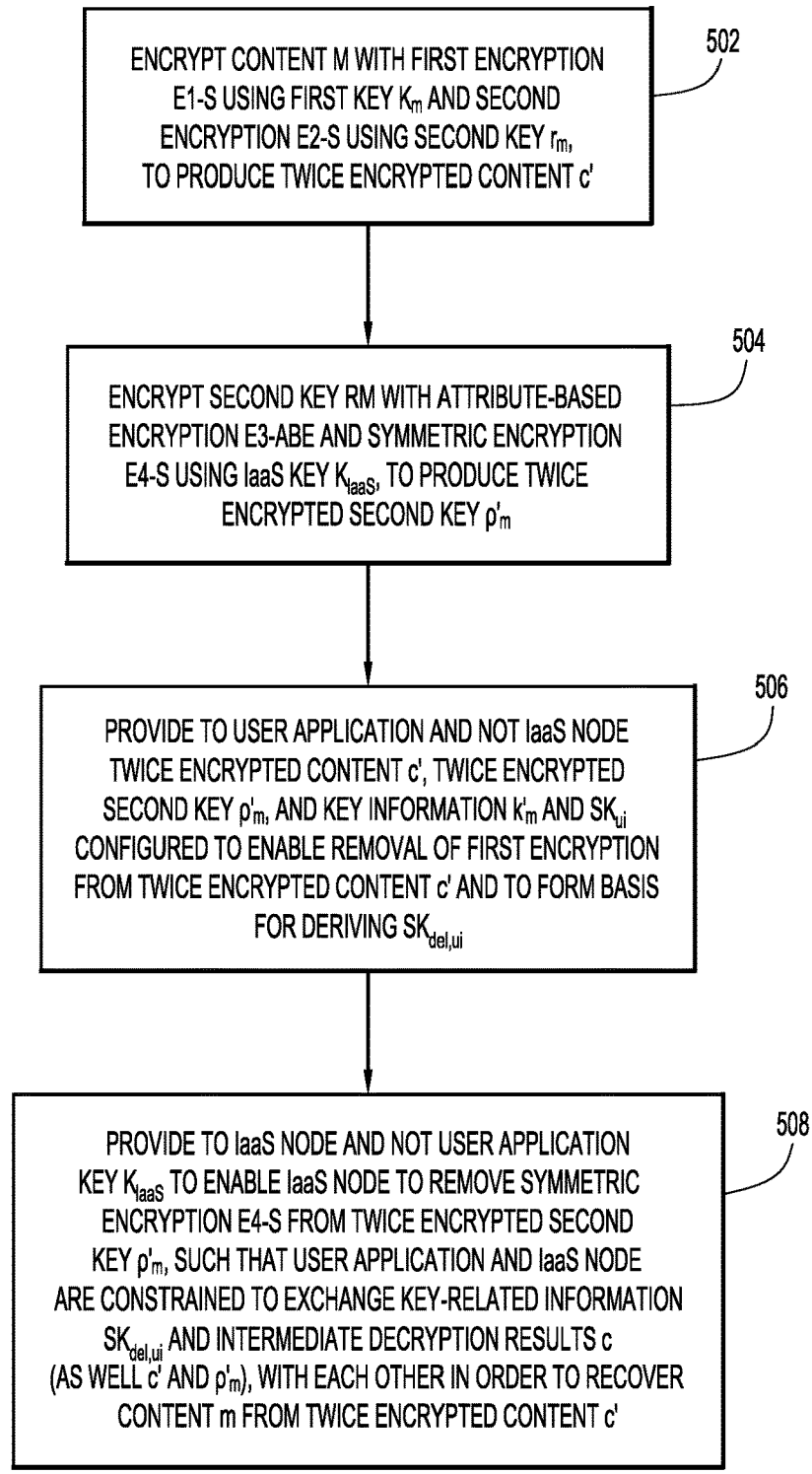
FIG. 5A is a flowchart of a method of access control performed at an IoT provider or producer of the system of FIG. 1, according to an example embodiment.

With reference to FIG. 5A, there is a flowchart of an example method 500 of access control performed at the producer P (also referred to as a "producer device").

At 502, producer P encrypts content m with first encryption E1-S using first key $K_m$ and second encryption E2-S using second key $r_m$, to produce twice encrypted content c'.

At 504, producer P encrypts second key $r_m$ with attribute-based encryption E3-ABE and symmetric encryption E4-S using key $K_{IaaS}$, to produce twice encrypted second key $\rho'_m$.

At next operations 506 and 508, producer P provides to the user application and the IaaS node over network 108 mutually exclusive first information (including first key information) and second information (including second key information different from the first key information), respectively, required by the user application and the IaaS node to remove all of the encryption from the twice encrypted second key $\rho'_m$ and the twice encrypted content c', i.e., in order to recover the content m. Moreover, the first information and the second information are configured such that the user application and the IaaS node will be required (i.e., constrained) to exchange with each other key-related information based on the first key information and intermediate content decryption results in order to fully recover the content m.

More specifically, at 506, producer P provides to the user application but not the IaaS node the first information including the twice encrypted content c', the twice encrypted second key $\rho'_m$, and first key information $K'_m$ and $SK_{ui}$ configured to enable removal of the first encryption from the twice encrypted content and to form the basis for deriving $SK_{del,ui}$. At 508, producer P provides to the IaaS node but not the user application the second information including the second key information key $K_{IaaS}$ to enable the IaaS node to remove the symmetric encryption E4-S from the twice encrypted second key $\rho'_m$, such that the user application and the IaaS node are constrained to exchange key-related information $SK_{del,ui}$ and intermediate content decryption results c (as well c' and $\rho'_m$) with each other in order to recover the content from the twice encrypted content.

Figure 5B:
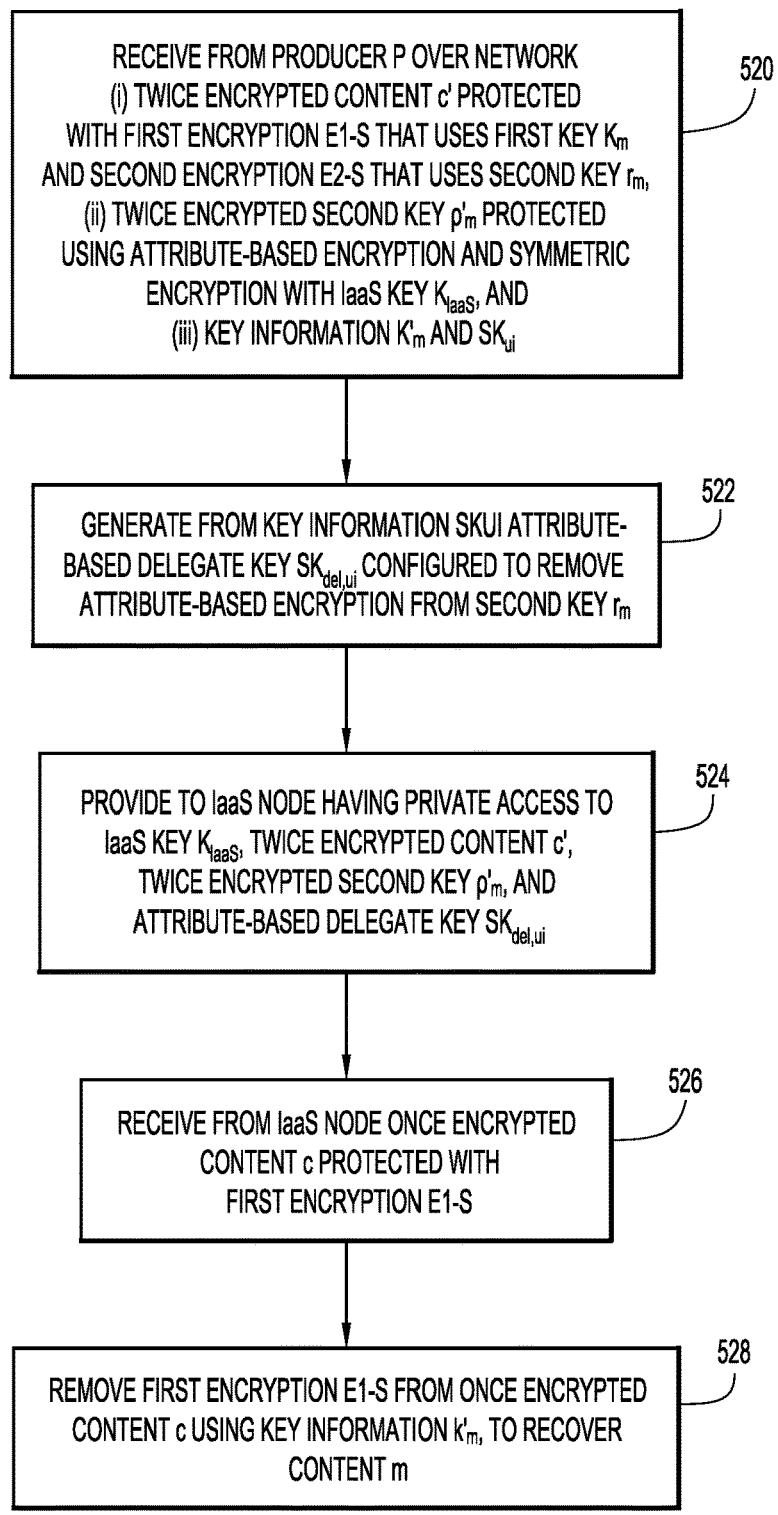
FIG. 5B is a flowchart of a method of access control performed at a user application of the system of FIG. 1, according to an example embodiment.

With reference to FIG. 5B, there is a flowchart of an example method 518 of access control performed at the user application.

At 520, the user application receives from the producer P over network 108 (i) twice encrypted content c' protected with first encryption E1-S that uses first key $K_m$ and second encryption E2-S that uses second key $r_m$, (ii) twice encrypted second key $\rho'_m$ protected using attribute-based encryption and symmetric encryption with IaaS key $K_{IaaS}$, and (iii) key information $K'_m$ and $SK_{ui}$.

At 522, the user application generates from key information $SK_{ui}$ attribute-based delegate key $SK_{del,ui}$ configured to remove the attribute-based encryption from the second key.

At 524, the user application provides to the IaaS node operated by the provider of the IaaS, and having private access to the IaaS key $K_{IaaS}$, the twice encrypted content c', the twice encrypted second key $\rho'_m$, and the attribute-based delegate key $SK_{del,ui}$.

At 526, the user application receives from the IaaS node once encrypted content c protected with the first encryption E1-S.

At 528, the user application removes the first encryption E1-S from the once encrypted content c using the key information $K'_m$, to recover the content m.

Figure 5C:
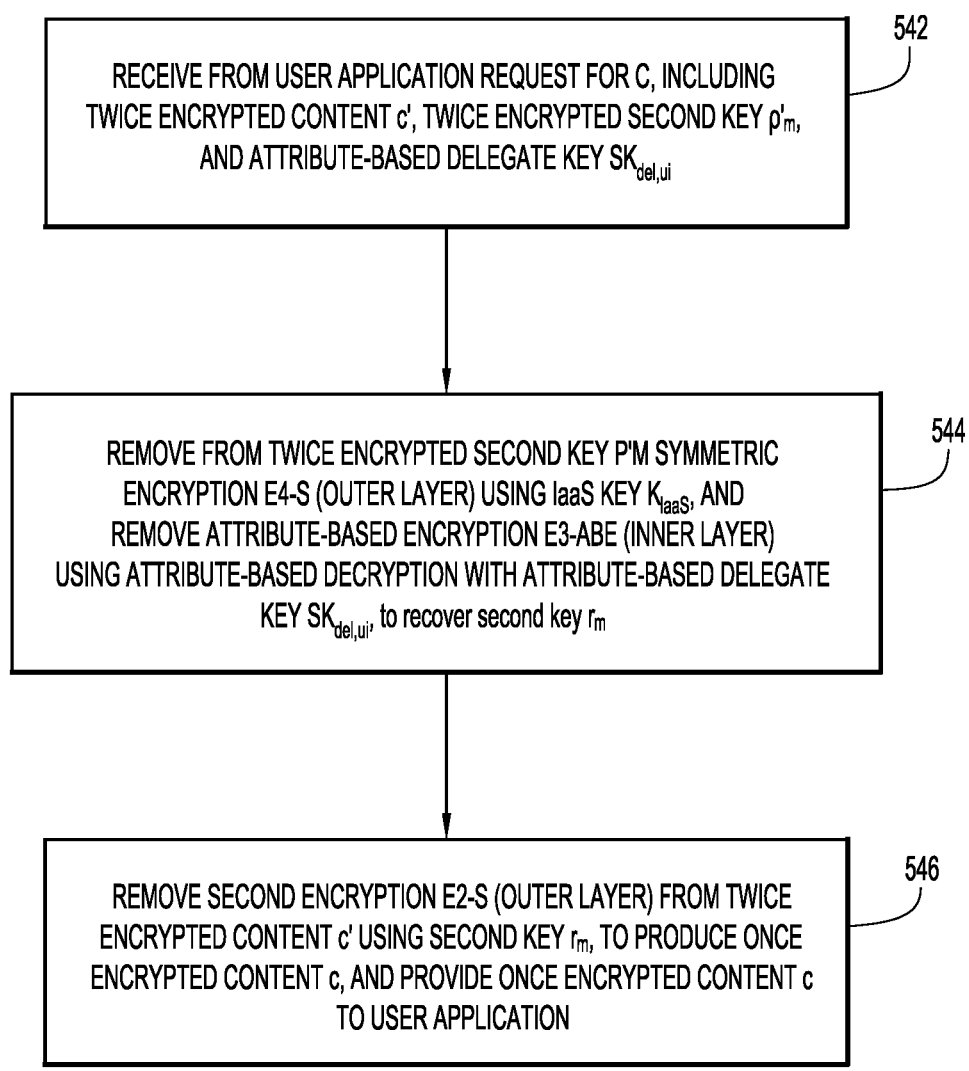
FIG. 5C is a flowchart of a method of access control performed by an IaaS node of the system of FIG. 1, according to an example embodiment.

With reference to FIG. 5C, there is a flowchart of an example method 540 of access control performed by the IaaS node.

At 542, the IaaS node receives from the user application a request for once encrypted content c. The request includes the twice encrypted content c', the twice encrypted second key $\rho'_m$, and the attribute-based delegate key $SK_{del,ui}$. The IaaS node performs next operations 544 and 546 responsive to the request.

At 544, the IaaS node removes from the twice encrypted second key $\rho'_m$ the symmetric encryption E4-S (outer layer) using the IaaS key $K_{IaaS}$, checks the validity of the once encrypted second key time-to-live information, and removes the attribute-based encryption E3-ABE (inner layer) using attribute-based decryption with the attribute-based delegate key $SK_{del,ui}$, to recover the second key $r_m$.

At 546, the IaaS node removes the second encryption E2-S (outer layer) from the twice encrypted content c' using the second key $r_m$, to produce the once encrypted content c, and provides the once encrypted content c to the user application.

Traceability

Traceability is a challenging issue in the context of CP-ABE, particularly for the case of black-box traceability. Such schemes generally impose high overhead with respect to both the size of ciphertext and keys, and the computational complexity of the construction, reducing the practical use of the scheme. The above-described protocol integrates traceability, while at the same time maintaining a low overhead. In order to achieve this, the protocol provides full traceability based on the weaker white-box traceability property, which is considerably more lightweight than black-box schemes. The protocol includes two ABE decryption operations, one performed by the user on $K'_m$, and one performed by the IaaS node on $r'_m$. Since under the above-mentioned assumptions the IaaS node follows the protocol, only a well-formed decryption key $SK_{del,ui}$ can be used to decrypt $r'_m$. Therefore, a malicious user who wishes to provide access to an unauthorized user must leak a well-formed version of the malicious user's private key, otherwise the decryption of $r'_m$ by the IaaS node would fail. Thus, it can be assumed that malicious users must leak a well formed key, and therefore the protocol can safely employ an efficient, white-box traceable CP-ABE construction and still provide full traitor tracing.

Revocation

The system considers a subscription-based system: developers obtain a subscription for the IoT data, valid for a time period T. As a consequence, revocation happens at predefined times, rather than at arbitrary points in time. Since the expiration date of a user's key is known a priori, it can be embedded as an attribute $\gamma_{exp}$ in the key itself. Respectively, an additional condition in the access structure (Lm and TKO is introduced, such that only a key with an expiration attribute greater than the publication date D can satisfy the policy. The producer P can revoke access to a user whose subscription expired by simply republishing $\rho'_m$ with an updated date D. Given that revocation happens at predefined time intervals decided by the producer P, $\rho'_m$ is small, and no interaction between the actors is required, revocation events pose no scalability issues in the protocol.

Since the revocation system is based on updating the published $\rho'_m$, the protocol ensures that users cannot simply reuse an old, previously published value to retain access after revocation. Indeed, an authorized user could potentially download all currently published $\rho'_m$, $K_m$ and store them in local storage of the authorized user. After revocation, the user could simply retrieve c', send a request to the IaaS node with the user's (expired) key $SK_{ui}$ along with an old $\rho'_m$ copy, and the node will return c, effectively breaking the revocation. In order to prevent this attack, the protocol concatenates the expiration information $\omega_{rm}$, which indicates a time-to-live value for $r_m$, to $r'_m$. Upon receiving a request from a user, the IaaS node verifies the signature on $\rho'_m$ to authenticate the parameter received, validates $\omega_{rm}$, and returns c if they are valid, or $\perp$ otherwise.

Security Analysis

The security property of the protocol with respect to different attackers, both individual and colluding, is now described. The following discussion makes the distinction between unauthorized users and revoked users. "Unauthorized users" are defined as users who were never authorized to access any protected data, and "revoked users" are defined as users who were previously authorized, but lost their access privileges.

General Security

Since $K_m$ and $r_m$ are both published after encapsulating them with ABE, the security of the construction (i.e., the security provided by the protocol) with respect to an unauthorized user relies on the security of the underlying CP-ABE scheme used. As an alternative to the CP-ABE scheme described above, any white-box traceable CP-ABE scheme can be used in the protocol/construction, which in turn is derived from and is proven selectively secure under the standard model. As a consequence, the protocol/construction is selectively secure against any (group of) unauthorized user.

IaaS Provider and Unauthorized Users

Under the assumptions listed above, the IaaS node follows the defined protocol, but tries to obtain as much information about the protected content as possible. As in the general case, the IaaS node has access to the public c', $K'_m$, and $\rho'_m$. Additionally, the IaaS node knows the symmetric key $K_{IaaS}$ and learns the delegate key $SK_{del,ui}$ of the user during the content retrieval phase. Given this information, the IaaS node can strip the outer encapsulation layer of c' to obtain the ciphertext $c=Dec(r_m,c')$. In order to further decrypt c and recover m, the IaaS node needs to be able to obtain the symmetric key $K_m$, which is encrypted with ABE under access structure $\tau_{Km}$. However, since $SK_{del,ui}$ does not include the attribute $\gamma_K$ required to satisfy $\tau_{Km}$, the IaaS node is unable to decrypt $K'_m$ and therefore cannot recover the plaintext m. Furthermore, under the assumptions, the IaaS provider can collude with unauthorized users; however, since unauthorized users do not possess any additional information with respect to the IaaS provider, the security considerations for this scenario are the same as those considering only the IaaS.

Revoked Users

After revocation, a user retains the private ABE key of the user and potentially all symmetric keys $K_m$ for the contents the user had access to during the subscription (it can be assumed that the user stored the keys locally to the user). With respect to new content published after the revocation, the user is in the same position as any other unauthorized user since the user's private key $SK_{ui}$ is not valid anymore, and therefore the security in this case reduces to security in the general case. However, with respect to content published when the user had an active subscription, the revoked user knows the symmetric key $K_m$, and therefore, given c, the user would be able to obtain the plaintext m. In order to recover c, the revoked user needs to strip the outer encryption layer. Since the IaaS node rejects expired $\rho'_m$, and since the revoked user's key $SK_{ui}$ is invalid for current $\rho'_m$, the revoked user is unable to obtain c. Therefore revoked users do not learn anything about any content published after their revocation.

Colluding IaaS Node and Revoked Users

The collusion between the IaaS and revoked users poses a considerable challenge.

First, two cases should be distinguished: (1) the IaaS node colludes with a revoked user, but still strictly follows the protocol; and (2) the IaaS node colludes with a previously revoked user and does not follow the protocol. In case (1), the IaaS node and the revoked user know the symmetric key $K_m$ for all the content published while the user had a valid subscription (it is assumed that the user previously stored them). Therefore, in order to obtain m they need to recover $r_m$ and strip the outer encapsulation layer of c'. However, since the IaaS node is following the protocol (and therefore would reject expired $\rho'_m$), and the user is unable to decrypt $\rho'_m$ (since that user is revoked), they cannot obtain $r_m$, and hence the plaintext. In case (2), the IaaS node and revoked user know $K_m$ and, since IaaS node is not following the protocol, they can obtain $r_m$ using an expired $\rho'_m$. At this point, the IaaS node and the user can recover the plaintext m. However, there are few points worth noting relative to case (2):

a. The previously published content needs to be available in a cache of at least one node of the ICN network in order for the user to retrieve that content. If the content is retrieved directly from the producer P, the producer can re-encrypt and publish the content under a new key $K_m$.

b. The revoked user needs to store all keys $K_m$ and all $\rho'_m$ for each content the user wishes to access after the user's subscription expires.

c. The IaaS provider must disregard the protocol and any (contractual) agreement with the producer P. If exposed, the IaaS provider will likely suffer economically, both from reputation damage and potential litigation.

d. Even if points (a), (b) and (c) hold true, the IaaS provider and the revoked user obtain access only to the content for which the user had access during the user's subscription.

Given points (a)-(d), the above-mentioned collusion is not considered to be a significant issue in practice.

Colluding Authorized and Unauthorized Users

An authorized user $u_A$ will be able to provide access to restricted content to an unauthorized user $u_U$, either by providing $u_U$ with the authorized user's credentials or by leaking the protected content. In this case, the security goal to be achieved is not confidentiality of the content, but rather traitor tracing, i.e. being able to identify who leaked the access credentials. With respect to traceability, it can be shown that, in order to provide $u_U$ with access to the protected content, $u_A$ must either leak information that unambiguously identifies $u_A$, or leak as much information as the size of the content itself (at which point $u_A$ can just leak the content). In the protocol/construction, an authorized user $u_A$ has access to the symmetric encryption key $K_m$ and possesses a valid ABE key $SK_{uA}$. The user $u_A$ can safely leak the symmetric key, since it would be obviously impossible to trace it back to $u_A$ given that all authorized users have access to it. However, leaking $K_m$ is not enough to give access to an unauthorized user. In order to provide access to $u_U$, $u_A$ can either:

a. Leak user $u_A$'s secret key $SK_{uA}$ to $u_U$; however, since $u_A$ would have to leak a well-formed key $SK'u_A$, given the key, the producer P would be able to identify $u_A$.

b. Leak content c. Authorized users cannot leak $r_m$, which is only known to the IaaS node, but only the stripped ciphertext c, which is the same size as the content itself.

Therefore, an authorized user $u_A$ can either leak a key that directly identifies $u_A$, or leak as much information as the plaintext content itself.

Various performance aspects of the protocol have been evaluated experimentally. In particular, the time and spatial/size overhead introduced by the cryptographic operations of the protocol have been examined using (i) for ABE operations, a 160-bit elliptic curve group based on a supersingular curve with embedding degree 2, over a 512-bit finite field, and (ii) for symmetric encryption operations, 128-bit keys.

Published Size Overhead

Different tests with varying size for the original unencrypted content m were executed. The size overhead introduced by the protocol becomes negligible as the size of the original content m increases. The size overhead is high for small contents m, where the published content c' is up to 3.37 times the original size for a content m of 1 KB; however as the original content size increases, the size overhead ratio quickly decreases, reaching 0.16 for a 16 KB content and falling as low as 0.0027 for a 1 MB content. If the average size of 3 MB for a web page is considered, the size overhead introduced by the protocol represents only ~0.1% of the original content size. This behavior is due to the fact that the overhead introduced by ABE, which is the main contributor to the total overhead of the protocol for low content sizes, is independent of the size of the published content.

Publication and Consumption Time Overhead

In addition to the size overhead, the computational time overhead introduced by the protocol in the publication and consumption phases has also been evaluated. As for the size overhead evaluation, to measure time overhead different tests with varying size of the original unencrypted content were executed. For each original content size, the time required to publish and to consume the content over 100 iterations was averaged. This revealed that both publication and consumption times remain considerably low. Indeed, even for content sizes in the order of hundreds of MB, both publication and consumption times remain well under 300 ms.

What follows is a brief discussion of how the protocol can be transparently integrated with applications, the applicability of the protocol in a case of small content size, and possible modifications to adapt the protocol to different scenarios.

Transparent Integration within Existing Stack

The protocol can be integrated in an IaaS deployment in a transparent manner from the point of view of existing applications. Indeed, the protocol can be easily implemented in a dedicate layer, the security layer, located between the network and application layers. The security layer acts as a proxy, intercepting interest requests from the application and issuing the corresponding interest requests for the encrypted contents c', $K'_m$ and $\rho'_m$ to the network layer. For the protocol to be transparent to the application, there should be a way for the producer P to mark protected contents, along with an agreed protocol to identify $K'_m$ and $\rho'_m$. In practical terms, this can be implemented by taking advantage of features similar to manifests in CCN. Upon publication, the producer P issues a manifest file, indicating the fact that access to the content is restricted. The manifest should further include the name of main content c', along with the names of the content blocks $K'_m$ and $\rho'_m$. Upon manifest retrieval, the security layer issues separate interests for all the names, decrypts the content with the help of the local IaaS node, and returns the plaintext to the requesting application. The protocol integration and the flow of interest/content packets with the application and network layers is depicted in FIG. 6.

Figure 6:
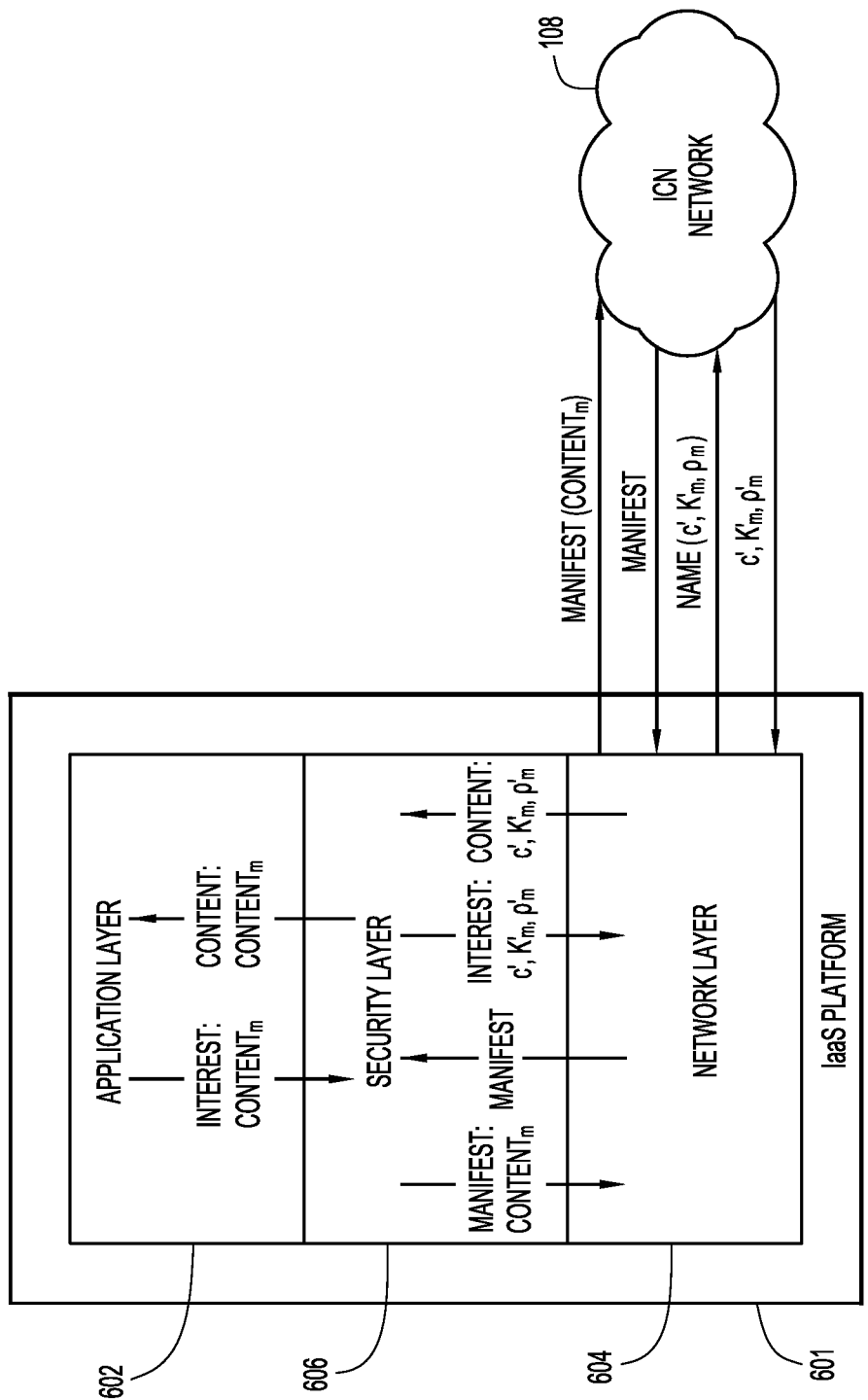
FIG. 6 is a block diagram of an IaaS platform that hosts application layers for the access protocol, and a flow of interest/content packets between the application layers, according to an example embodiment.

With reference to FIG. 6, an IaaS platform 601 (e.g., one or more of nodes 116) hosts an application layer 602, a network layer 604 that communicates directly with ICN network 108, and a security layer 606 between and that communicates with the application layer and the network layer. In example transactions for the protocol, application layer 602 sends to security layer 606 an Interest requesting content m by name. In response to the Interest, security layer 606 sends to network layer 604 a request for a manifest (i.e., a "manifest request") for the content m by name. Network layer 604 forwards the manifest request (destined for producer P) to ICN network 108. In response to the manifest request, ICN network 108 returns to network layer 604 the requested manifest (originated from producer P), which the network layer then forwards to security layer 606. The manifest lists data objects c', $K'_m$, and $\rho'_m$, related to content m, by their respective names. Security layer 606 generates Interests each requesting a respective one of data objects c', $K'_m$, and $\rho'$ by name as listed in the manifest, and sends the Interests to network layer 604, which then forwards the Interests (destined for producer P) to ICN network 108. In response to the Interests, ICN network 108 returns to network layer 604 the data objects (originated from producer P) satisfying the Interests, which the network layer then forwards to security layer 606. In the example of FIG. 6, application layer 602 and security layer 606 may be merged into a single user application layer.

Also, it is understood that gateway 114 of producer P may host processing/protocol layers similar to layers 602-606 configured to perform ICN functions, such as generating first Interests requesting content by name, transmitting the first Interests to the ICN, receiving second Interests requesting content by name, retrieving the content named in the second Interests locally, and transmitting to the ICN the retrieved content as named data objects. As mentioned above, gateway 114 generates data objects c', $K'_m$, and $\rho'_m$. As part of publishing operations, gateway 114 associates a respective name with each data object, generates the above-mentioned manifest including the list of the names associated with the data objects, and may transmit the manifest to the ICN when requested.

Dealing with Small Content

In some contexts, the size of published content can be very small. Since the protocol requires the publication of the encrypted first and second layer symmetric keys together with the content, in these scenarios the overhead of the protocol can become considerable; however, if the size of the content gets very small, then it is possible to apply public-key encryption techniques directly on the content, rather than using hybrid encryption. Indeed, the point of hybrid encryption is to avoid expensive public-key encryption on large contents, since the time required would render such solutions impractical. Moreover, even in case of very small contents published very frequently, in which case public-key encryption would be impractical, the protocol can still be applied. In fact, it is worth noting that the producer can logically aggregate several small contents and use a single pair of encryption keys for all of them. This effectively spreads the protocol overhead over several publications, while still maintaining the same security guarantees.

Access Control without Gateways

In the system of FIG. 1, the IoT devices 112 are connected to the Internet through gateway 114. To implement the protocol, the gateway 114 performs a number of cryptographic operations on the content and the two symmetric keys before publication. If performed directly by the IoT devices 112 themselves, some of these operations can be too time consuming. In particular, ABE requires pairing operations and exponentiations, which are computationally expensive and not usually suitable for IoT devices. In order to adapt the protocol to run directly on the IoT devices, the ABE encryption operations can be moved to an external server managed by the producer P. In this arrangement, the IoT devices 112 generate random $K_m$ and $r_m$ and perform symmetric encryption on the content, like in the protocol described in detail above; however, rather than encrypting $K_m$ and $r_m$, the devices forward them to the server, which then computes $r'_m$ and $K'_m$ and publishes them in the network 108.

Removing Revocation Time-Dependence

Coherently with the system of FIG. 1, the protocol provides for revocation upon expiration of user subscription. If necessary, the revocation phase of the protocol can be augmented by combining CP-ABE with proxy re-encryption (PRE) or mediated encryption in order to enable arbitrary user revocation. Both PRE and mediated encryption allow the provider to delegate the user revocation process to the IaaS provider, without the need to republish $\rho'$.

Extension to General Access Control

While the protocol is described by way of example to meet the needs of IoT (e.g., relying on the IaaS provider), the protocol can also be employed as a general purpose access control protocol for ICN, with some adaptations. In particular, without the IaaS provider to act as an intermediary, all decryption operations can be performed directly by the end users. However, this implies that a user can store $r_m$ and $K_m$ for each content the user has access to while the user is subscribed in order to retain access to m once the subscription expires. Effectively, in this scenario, the protocol may be limited to preventing revoked users from accessing newly published content. This limitation can be mitigated if the producer uses Digital Right Management (DRM) systems. If it is assumed that the presence of a DRM safely stories $K_{IaaS}$ so that the user cannot access it, then the security properties of the protocol hold.

Figure 7:
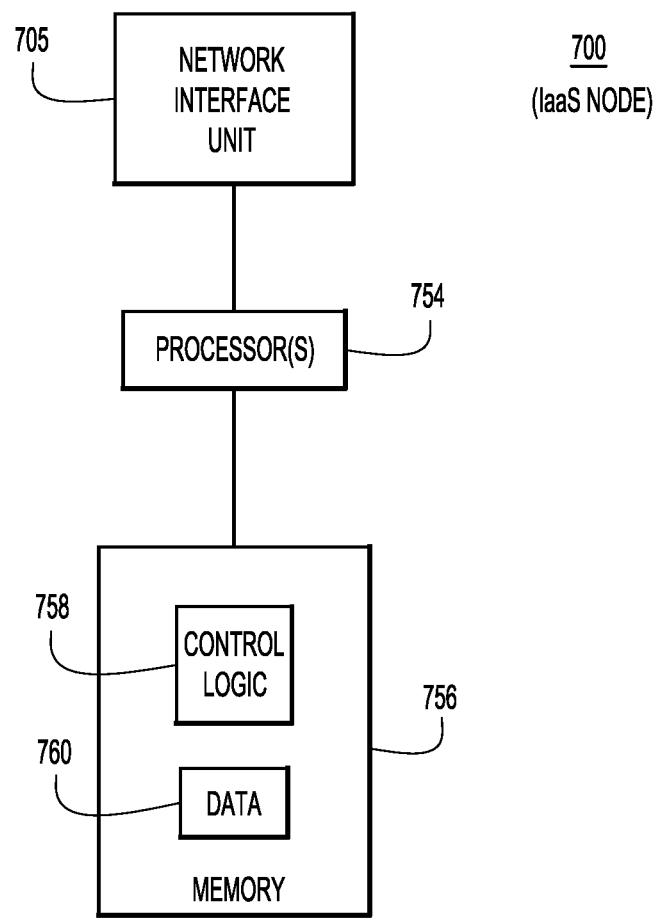
FIG. 7 is a hardware block diagram of a computer device configured to host the user application or to operate as an IaaS node of the system of FIG. 1, according to an example embodiment.

With reference to FIG. 7, there is a block diagram of an example computer device 700, such as a server device, or other platform configured to provide compute, storage, and network resources, representative of each of nodes 116 provided by IaaS provider 106. Computer device 700 includes network interface unit 705 to communicate with a wired and/or wireless communication network, including ICN network 108. Computer device 700 also includes a processor 754 (or multiple processors, which may be implemented as software or hardware processors), and memory 756. Network interface unit 705 may include an Ethernet card with a port (or multiple such devices) to communicate over wired Ethernet links and/or a wireless communication card with a wireless transceiver to communicate over wireless links.

Memory 756 stores instructions for implementing methods described herein. Memory 756 may include read only memory (ROM), random access memory (RAM), magnetic disk storage media devices, optical storage media devices, flash memory devices, electrical, optical, or other physical/tangible (non-transitory) memory storage devices. The processor 754 is, for example, a microprocessor or a microcontroller that executes instructions stored in memory. Thus, in general, the memory 756 may comprise one or more tangible computer readable storage media (e.g., a memory device) encoded with software comprising computer executable instructions and when the software is executed (by the processor 754) it is operable to perform the operations described herein. For example, memory 756 stores control logic 758 to perform operations for the IaaS node, the security layer, and the user application as described herein. The memory 756 may also store data 760 used and generated by logic 758, as described herein.

Figure 8:
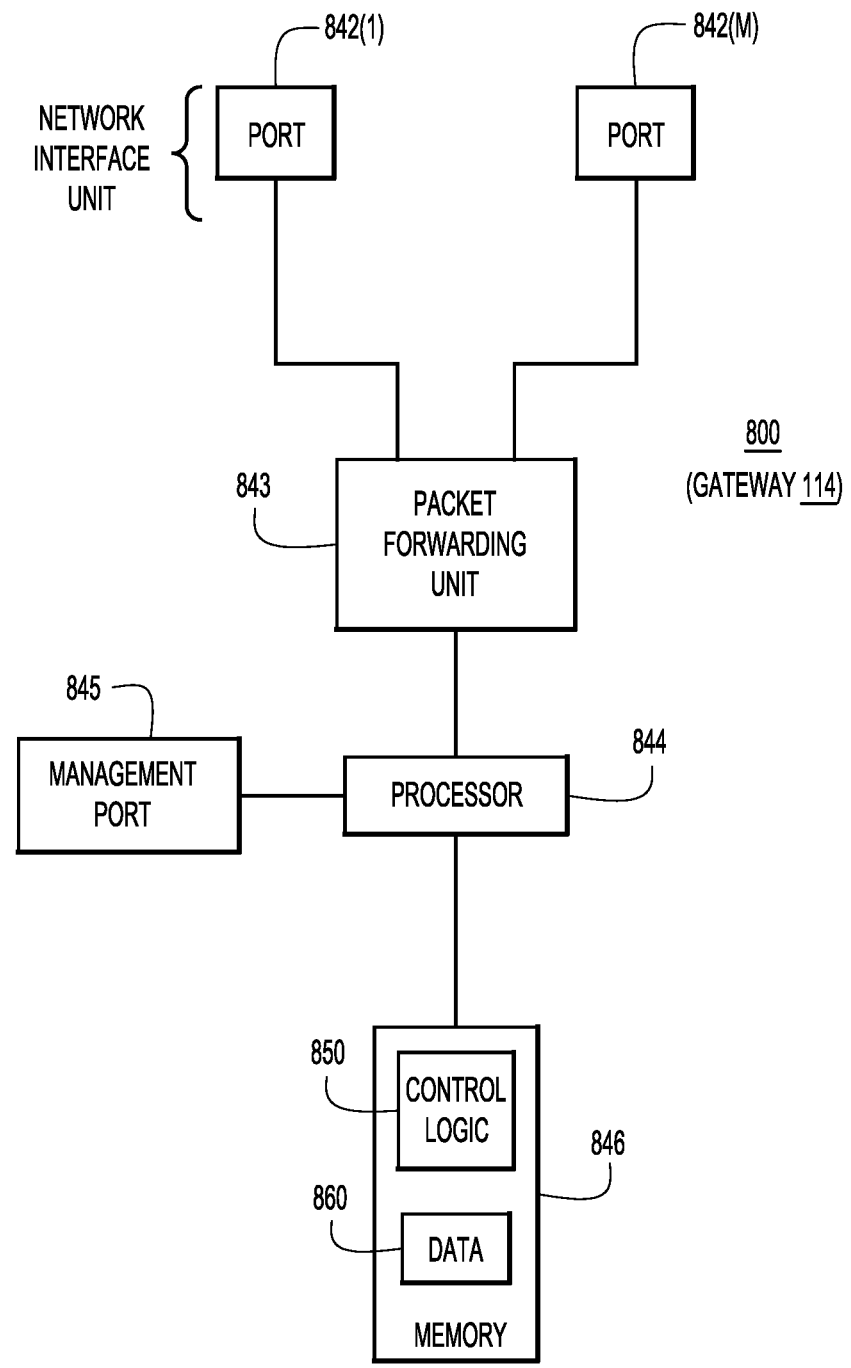
FIG. 8 is a hardware block diagram of a network device of an IoT provider of the system of FIG. 1, according to an example embodiment.

With reference to FIG. 8, there is a block diagram of an example network device 800, representative of gateway 114. Network device 800 may be a router or a switch, for example. Network device 800 comprises a network interface unit having a plurality of network input/output (I/O) ports 842(1)-1442(M) to send traffic (e.g., IP packets) to a network (e.g., ICN network 108) and receive traffic (e.g., IP packets) from the network and from IoT devices 112, a packet forwarding/processing unit 843, a network processor 844 (also referred to simply as "processor"), a management port 845 to exchange control messages with other network devices and an administration function, and a memory 846. The packet forwarding/processing unit 843 is, for example, one or more application specific integrated circuits (ASICs) that include packet buffers, packet queues, and other control logic for performing packet forwarding operations. The processor 844 is a microcontroller or microprocessor that is configured to perform higher level controls of network device 800. To this end, the memory 846 stores software instructions that, when executed by the processor 844, cause the processor 844 to perform a variety of operations including operations described herein. For example, the memory 846 stores instructions for control logic 850 to perform operations of producer P described herein. Control logic 850 may also include logic components in packet forwarding unit 843. Memory 846 also stores data 860 used and generated by logic 850 as described herein.

The embodiments presented above provide a fine-grained access control protocol for IoT deployments over ICN. The protocol preserves ICN network caching and location-independent content retrieval, while at the same time providing fine-grained access control, revocation and traitor tracing capabilities. The protocol provides enhanced security, while keeping both computational and size overhead remain low. In particular, for a content the size of an average webpage, the protocol introduces a size overhead of ~0.1% and a computational overhead of less than 100 ms for each of the two operations, making it widely applicable in practical deployments.

In summary, embodiments presented herein provide content access control via a protocol that is based on attribute based encryption and layered encryption, which enables IoT devices to take advantage of IaaS platforms such as Cloud and Fog. The use of attribute based encryption ensures confidentiality of the content and fine-grained access control. Moreover, the use of layered encryption provides an additional layer of security against key disclosure attacks by authorized users. By exploiting the presence of an IaaS platform, the protocol splits the information necessary to access protected content between the IaaS platform (e.g., the IaaS node) and the user applications, so that no single party alone has enough information to decrypt the content. Moreover, the IaaS platform is used as a kind of trusted platform module in order to securely implement hybrid encryption and to enable revocation while using Ciphertext-policy Attribute-Based Encryption (CP-ABE). After the content producer (the IoT devices, or the gateway they are connected to) encrypts the content to be published using symmetric encryption, the protocol encrypts the symmetric key using ABE, and adds another layer of encryption on the encrypted content itself. The IaaS node is able to strip the outer encryption layer from the content, while the user application can recover the symmetric key (and therefore, given the stripped encrypted content, it can obtain the plaintext). However, individually neither the user application nor the IaaS node has enough information to retrieve the unencrypted content. Therefore, the user application must cooperate with the IaaS in order to obtain the plaintext. More in detail, after symmetrically encrypting the content, the producer generates, e.g., a random nonce r, which is used to further encrypt the content a second time. The original symmetric key and the nonce themselves are then encrypted using ABE so that only applications with certain attributes (i.e., authorized applications) can recover them. The nonce is further encrypted a second time using symmetric encryption, with secret key already shared between the producer and the IaaS (e.g., at system bootstrap). The producer then publishes the (twice) encrypted content, the encrypted symmetric key, and the (twice) encrypted nonce. To consume the content, the user application provides the IaaS node with a delegate ABE key, which allows decryption of the random nonce (but not of the symmetric key), and requests the IaaS node to strip the outer encryption layer from the content. The IaaS node first removes the outer encryption layer from the nonce by using the secret key, and then uses the delegate ABE key to remove the last encryption layer. This last step succeeds only if the application is authorized to access the content. Finally, the IaaS node uses the random nonce to strip the outer encryption layer from the content and returns it to the user application. At this point, the content still has one layer of symmetric encryption. In the last step, the application decrypts the symmetric key using his ABE key, and finally decrypts the content to obtain the plaintext.

In summary, in one aspect, a method is provided comprising: at a producer device configured to communicate over a network with a user application in an infrastructure-as-a-service (IaaS) and with an IaaS node operated by a provider of the IaaS: encrypting content with first encryption using a first key and with second encryption using a second key, to produce twice encrypted content; encrypting the second key with attribute-based encryption and with symmetric encryption using an IaaS key, to produce a twice encrypted second key; providing to the user application the twice encrypted content, the twice encrypted second key, and key information configured at least to enable decryption of the first encryption from the twice encrypted content; and providing to the IaaS node the IaaS key to enable the IaaS node to remove the symmetric encryption from the twice encrypted second key, such that the user application and the IaaS node are constrained to exchange with each other key-related information and intermediate decryption results for the content in order to recover the content from the twice encrypted content.

In another aspect an apparatus is provided comprising: multiple network ports for communicating with a network; and a processor coupled to the network ports and configured to communicate over the network with a user application in an infrastructure-as-a-service (IaaS) and with an IaaS node operated by a provider of the IaaS, the processor further configured to perform: encrypting content with first encryption using a first key and with second encryption using a second key, to produce twice encrypted content; encrypting the second key with attribute-based encryption and with symmetric encryption using an IaaS key, to produce a twice encrypted second key; providing to the user application the twice encrypted content, the twice encrypted second key, and key information configured at least to enable decryption of the first encryption from the twice encrypted content; and providing to the IaaS node the IaaS key to enable the IaaS node to remove the symmetric encryption from the twice encrypted second key, such that the user application and the IaaS node are constrained to exchange with each other key-related information and intermediate decryption results for the content in order to recover the content from the twice encrypted content.

In a further aspect, a method is provided comprising: at a user application hosted on a platform of an Infrastructure-as-a-Service (IaaS) connected to a network: receiving from a producer device over the network twice encrypted content protected with first encryption that uses a first key and second encryption that uses a second key, a twice encrypted second key protected with attribute-based encryption and symmetric encryption using an IaaS key, and key information to include an attribute-based private user key; generating from the attribute-based private user key an attribute-based delegate key configured to remove the attribute-based encryption from the second key; providing to an IaaS node configured on the IaaS and having private access to the IaaS key, the twice encrypted content, the twice encrypted second key, and the attribute-based delegate key; receiving from the IaaS node once encrypted content protected with the first encryption; and removing the first encryption from the once encrypted content using the key information, to recover the content.

In yet another aspect, a non-transitory computer readable medium is provided. The computer readable medium is encoded with instructions that, when executed by a processor, of a master network device among network devices of a cluster, cause the processor to perform operations to implement the methods described above.

The above description is intended by way of example only. Various modifications and structural changes may be made therein without departing from the scope of the concepts described herein and within the scope and range of equivalents of the claims.

What is claimed is:

1. A method comprising:
   at a producer device configured to communicate over a network with a user application in an infrastructure-as-a-service (IaaS) and with an IaaS node operated by a provider of the IaaS:
      encrypting content with first encryption using a first key to produce once encrypted content, and encrypting the once encrypted content with second encryption using a second key, to produce twice encrypted content;
      encrypting the second key with attribute-based encryption and with symmetric encryption using an IaaS key, to produce a twice encrypted second key;
      providing to the user application the twice encrypted content, the twice encrypted second key, and key information configured at least to enable decryption of the first encryption from the twice encrypted content; and
      providing to the IaaS node the IaaS key to enable the IaaS node to remove the symmetric encryption from the twice encrypted second key; and
   at the user application:
      deriving from the key information a delegate key to remove the attribute-based encryption from the twice encrypted second key, and providing to the IaaS node the delegate key, the twice encrypted content, and the twice encrypted second key;
      receiving, from the IaaS node, the once encrypted content; and
      removing the first encryption from the once encrypted content based on the key information.

2. The method of claim 1, wherein:
   the encrypting the content includes encrypting the content such that the first encryption includes first symmetric encryption using the first key as a symmetric key and the second encryption includes second symmetric encryption using the second key as a symmetric key.

3. The method of claim 1, further comprising:
   encrypting the first key with attribute-based encryption, to produce an encrypted first key; and
   generating an attribute-based private user key configured to decrypt the encrypted first key using attribute-based decryption,
   wherein the providing to the user application includes providing to the user application the key information to include the encrypted first key and the attribute-based private user key to enable the user application to decrypt the encrypted first key.

4. The method of claim 3, wherein:
   the generating the attribute-based private user key binds the attribute-based private user key to one or more user attributes associated with the user application and available to the user application.

5. The method of claim 3, wherein:
   the attribute-based private user key is configured for deriving an attribute-based delegate key configured to enable removal of the attribute-based encryption from the twice encrypted second key.

6. The method of claim 1, further comprising:
   generating an attribute-based private user key configured for removing the attribute-based encryption from the twice encrypted second key,
   wherein the providing to the user application includes providing to the user application the key information to include the attribute-based private user key.

7. The method of claim 1, wherein the encrypting the second key further includes:
   encrypting the second key with the attribute-based encryption to produce a first encrypted second key;
   concatenating the first encrypted second key with a time expiration parameter for the second key to produce a concatenated second key; and
   encrypting the concatenated second key with the symmetric encryption to produce the twice encrypted second key.

8. The method of claim 1, wherein the providing to the user application includes providing to the user application the key information to include the first key in encrypted form and an attribute-based private user key configured to decrypt the first key in the encrypted form using attribute-based decryption, to recover the first key.

9. The method of claim 1, wherein the network includes an Information Centric Networking (ICN) network, and the method further comprises, at the producer device:
   associating respective names with the twice encrypted content, the twice encrypted second key, and the key information; and
   upon receiving from the ICN network Interests requesting the twice encrypted content, the twice encrypted second key, and the key information by the respective names, sending to the ICN network data objects including the twice encrypted content, the twice encrypted second key, and the key information, and the respective names.

10. The method of claim 1, further comprising, at the user application:
receiving from the producer device over the network the twice encrypted content, the twice encrypted second key, and the key information to include an attribute-based private user key,
wherein the deriving the delegate key includes deriving from the attribute-based private user key an attribute-based delegate key configured to remove the attribute-based encryption from the twice encrypted second key, and wherein the providing to the IaaS node further includes providing to the IaaS node the attribute-based delegate key.

11. The method of claim 10, wherein the receiving from the producer device further includes receiving the key information to include an encrypted first key, the method further comprising, at the user application:
decrypting the encrypted first key with attribute-based decryption using the attribute-based private user key, to recover the first key,
wherein the removing the first encryption from the once encrypted content includes decrypting the once encrypted content using the first key.

12. The method of claim 10, further comprising, at the IaaS node:
obtaining from the user application the twice encrypted content, the twice encrypted second key, and the attribute-based delegate key;
removing from the twice encrypted second key the symmetric encryption using the IaaS key, and removing the attribute-based encryption with attribute-based decryption using the attribute-based delegate key, to recover the second key; and
removing the second encryption from the twice encrypted content using the second key, to produce the once encrypted content, and providing the once encrypted content to the user application.

13. A system comprising:
a user application in an infrastructure-as-a-service (IaaS);
an IaaS node operated by a provider of the IaaS; and
a producer device configured to communicate over a network with the user application and with the IaaS node;
wherein the producer device is configured to perform:
encrypting content with first encryption using a first key to produce once encrypted content, and encrypting the once encrypted content with second encryption using a second key, to produce twice encrypted content;
encrypting the second key with attribute-based encryption and with symmetric encryption using an IaaS key, to produce a twice encrypted second key;
providing to the user application the twice encrypted content, the twice encrypted second key, and key information configured at least to enable decryption of the first encryption from the twice encrypted content; and
providing to the IaaS node the IaaS key to enable the IaaS node to remove the symmetric encryption from the twice encrypted second key; and
wherein the user application is configured to perform:
deriving from the key information a delegate key to remove the attribute-based encryption from the twice encrypted second key, and providing to the IaaS node the delegate key, the twice encrypted content, and the twice encrypted second key;
receiving, from the IaaS node, the once encrypted content; and
removing the first encryption from the once encrypted content based on the key information.

14. The system of claim 13, wherein the producer device is further configured to perform:
encrypting the first key with attribute-based encryption, to produce an encrypted first key; and
generating an attribute-based private user key configured to decrypt the encrypted first key using attribute-based decryption,
wherein the producer device is configured to perform the providing by providing to the user application includes providing to the user application the key information to include the encrypted first key and the attribute-based private user key to enable the user application to decrypt the encrypted first key.

15. The system of claim 14, wherein:
the attribute-based private user key is configured for deriving an attribute-based delegate key configured to enable removal of the attribute-based encryption from the twice encrypted second key.

16. The system of claim 13, wherein the producer device is further configured to perform:
generating an attribute-based private user key configured for removing the attribute-based encryption from the twice encrypted second key,
wherein the producer device is configured to perform the providing by providing to the user application includes providing to the user application the key information to include the attribute-based private user key.

17. The system of claim 13, wherein the producer device is configured to perform the providing by providing to the user application the key information to include the first key in encrypted form and an attribute-based private user key configured to decrypt the first key in encrypted form using attribute-based decryption, to recover the first key.

18. A method comprising:
at a user application hosted on a platform of an Infrastructure-as-a-Service (IaaS) connected to a network:
receiving from a producer device over the network twice encrypted content protected with first encryption that uses a first key and second encryption that uses a second key, a twice encrypted second key protected with attribute-based encryption and symmetric encryption using an IaaS key, and key information to include an attribute-based private user key;
generating from the attribute-based private user key an attribute-based delegate key configured to remove the attribute-based encryption from the second key;
providing to an IaaS node configured on the IaaS and having private access to the IaaS key, the twice encrypted content, the twice encrypted second key, and the attribute-based delegate key;
receiving from the IaaS node once encrypted content protected with the first encryption; and
removing the first encryption from the once encrypted content using the key information, to recover the content.

19. The method of claim 18, wherein the receiving from the producer device further includes receiving the key information to include an encrypted first key, the method further comprising, at the user application:
decrypting the encrypted first key using attribute-based decryption with the attribute-based private user key, to recover the first key, wherein the removing the first encryption from the once encrypted content includes decrypting the once encrypted content using the first key.

20. The method of claim 19, further comprising, at the IaaS node:
  obtaining from the user application the twice encrypted content, the twice encrypted second key, and the attribute-based delegate key;
  removing from the twice encrypted second key the symmetric encryption using the IaaS key, and removing the attribute-based encryption using attribute-based decryption with the attribute-based delegate key, to recover the second key; and
  removing the second encryption from the twice encrypted content using the second key, to produce the once encrypted content, and providing the once encrypted content to the user application.

\* \* \* \* \*